United States Patent [19]

Cremonesi et al.

[11] 4,409,103

[45] Oct. 11, 1983

[54] METHOD FOR THE PREPARATION OF CALCIUM HEPARINATE

[75] Inventors: Pietro Cremonesi; Giancarlo Sportoletti, both of Milan, Italy

[73] Assignee: Italfarmaco S.p.A., Milan, Italy

[21] Appl. No.: 176,861

[22] Filed: Aug. 11, 1980

[30] Foreign Application Priority Data

Feb. 29, 1980 [IT] Italy ............................... 20313 A/80

[51] Int. Cl.$^3$ ............................................. B01D 13/00
[52] U.S. Cl. ...................................... 210/638; 210/651
[58] Field of Search ............... 210/638, 651, 644, 645; 404/101, 177; 260/121, 112 B

[56] References Cited

U.S. PATENT DOCUMENTS

| | | | |
|---|---|---|---|
| 3,228,877 | 1/1966 | Mahon | 210/638 |
| 3,817,831 | 6/1974 | Mancilla et al. | 210/638 X |

OTHER PUBLICATIONS

Michaels, "New Separation Technique for the CPI", from Chem. Eng. Progress, vol. 64, No. 12, 12-1968, pp. 31-43, 210-651.

Porter et al., Membrane Ultrafiltration, from Chem. Tech., Jan. 1971, pp. 56-63.

*Primary Examiner*—Frank A. Spear, Jr.
*Attorney, Agent, or Firm*—Bucknam and Archer

[57] ABSTRACT

A process for the preparation of the calcium salt of heparin containing an amount of sodium by weight not in excess of 0.1% and containing an amount of calcium by weight not less than 9.5% is described, which comprises subjecting a solution of sodium heparinate to dialysis, hyperfiltration (inverse osmosis) or ultrafiltration by means of a semi-permeable membrane and isolating the calcium heparinate with anticoagulant activity essentially equal to the anticoagulant activity of the sodium heparinate. For the ultrafiltration, a membrane may be used in the form of a planar sheet or a membrane in the form of a spiral or "needle" having a molecular nominal cut-off at 20,000 Dalton. For the hyperfiltration (inverse osmosis), a membrane may be used having a rejection of sodium ion between 0 and 75%. For the dialysis, a membrane may be used in the form of multiple sheets or a coiled tube or hollow fibers. A plurality of dialyzers in series or in parallel is used. The process may be carried out continuously or discontinuously.

4 Claims, No Drawings

METHOD FOR THE PREPARATION OF CALCIUM HEPARINATE

The present invention relates to heparin. More specifically, the present invention relates to a novel process for the purification of salts of heparin.

It is known that heparin sodium salts extracted from several organs from various animal species, such as lungs, intestinal mucosa, both bovine and swine, after suitable purification, are used therapeutically as anticoagulants. The use in human therapy of the sodium salts of heparin by the subcutaneous route has been limited by the ease of formation of hematoma, which results from the ability, particularly exhibited by the sodium salt of heparin to block vasal calcium of human tissues due to exhange of calcium with sodium so that capillary fragility results. This problem could be overcome by the use of the calcium salt. This product, the calcium salt, is described in French Patent No. 7313581, in which several specific properties of the calcium salt are reported, namely: sodium content, practically zero; weight percent of calcium, equal or greater than 10%. These values may also be expressed as sodium percentage by weight less than 0.1%, calcium percentage by weight 10.3–10.6%. The French patent also reports several pharmaceutical compositions based on the calcium derivatives of heparin.

After 1978, the calcium salt of heparin has been included in the British Pharmacopoeia, 1973-Addendum 1978, page 31. The characterization of the product for therapeutical use is very accurate and the sodium content by weight must be, at the most, 0.1%.

The preparation of the calcium salt is carried out from the commercial sodium salt and is based upon the greater affinity of calcium for glucosaminoglucans compared with sodium. However, the equilibration of the solution of sodium heparinate even with high quantities of calcium salt, such as the chloride or the acetate, even with equal weight, followed by a precipitation of calcium heparinate by variation of the solvent medium, leads to calcium heparinate preparations in which the calcium content is only 7–8% by weight and the sodium content is greater than 3% by weight, in other words, substantially inferior to the requirements of the British Pharmacopoeia.

The processes known in the art and which have been used up to the present time for the preparation of calcium heparinate with the properties described in the British Pharmacopoeia, involve either repeated treatments of precipitation in the presence of calcium salts or physico-chemical methods capable of shifting the equilibrium in the equation hereinbelow to the right:

Sodium heparinate⇌calcium heparinate     (Equation I)

Among the processes which have been used, there may be mentioned procedures involving static dialysis of solutions of sodium heparinate with calcium salts in which the anion may be organic or inorganic. Also some methods have been used based on the use of ion exchange resins in the acidic form which cause the formation of heparinic acid, which is then subsequently neutralized with the appropriate amount of calcium ion. The former process, which is described but not claimed in the French Patent No. 7313581, mentioned hereinabove, has some drawbacks because it is limited to small scale operation and is not suitable for industrial scale because of very prolonged dialysis periods in addition to difficulties connected with the static dialysis of sufficiently high volumes. The second type of process presents the drawbacks that the greatest difficulty is found in limiting the phenomena of antohydrolysis of the heparinic acid. In other words, it is necessary to cut down as much as possible the period of time between the stage during which heparinic acid is set free and the stage when heparinic acid is neutralized because the hydrolysis of the salt is accompanied by a decrease in the specific anticoagulant activity ($\mu$.I./mg).

The crux of the present invention resides in the finding that these drawbacks may be avoided and that it is possible to obtain calcium heparinate in accordance with the requirements specified in the British Pharmacopoeia using commercial sodium heparinate as a starting material. Essentially, the process according to the present invention consists of letting a solution of sodium heparinate flow on semi-permeable membranes capable of increasing the exchange capacity, in the presence of solutions of calcium chloride or another calcium salt. This flow may be achieved by utilizing dynamic methods of the type of diafiltration with membranes suitable for ultrafiltration having maximum molecular cut-off less than 20,000 Dalton, or membranes suitable for hyperfiltration (inverse osmosis), exhibiting low rejection towards sodium ion or the type suitable for dynamic dialysis, utilizing membranes having a cut-off less than 600 Dalton.

In a typical experiment carried out in a discontinuous operation, the solution of sodium heparinate, of suitable concentration depending whether the solution is to be subjected to ultrafiltration treatment or inverse osmosis, is pumped from container A with laminar flow onto a membrane carrying out the passage through the membrane of:

(1) water and glucosaminoglucans having a P.M. less than 2000 Dalton, that is having scanty or no anticoagulant activity if one intends to apply the ultrafiltration treatment, (2) water and sodium ions if one deals with inverse osmosis.

The solution which does not go through the membrane is recycled in container A keeping the concentration of glucosaminoglucans constant by accurate addition of an aqueous solution of calcium salt, for instance calcium chloride. The laminar flow of this solution through the membrane is repeated, carrying out downstream a further addition of a solution of calcium ions and repeating the cycle. In every passage through the membrane, there is elimination of sodium ions and partially also of calcium ions by shifting the equilibrium in favor of the formation of the calcium salt.

In industrial practice, it has been shown that it is particularly advantageous to use a continuous cycle with respect to the operating conditions described hereinabove.

In the case of the dynamic dialysis, the exchange of Ca-Na ions occurs by introducing either continuously or by recycling the solution of sodium heparinate of suitable concentration in a compartment of the dialyzer, while in the second compartment or in the second compartments, in the case of dialyzers in series, there is introduced, usually countercurrently, an aqueous solution of suitable concentration of an organic or inorganic calcium salt which may be soluble.

In the latter process, there may be utilized normal commercial hemodialyzers having hollow fibers or having a convoluted tube or a planar membrane, etc.

The following examples are described hereinbelow for the purpose of illustrating the method of this invention, but no attempt is made to limit the invention to the examples.

EXAMPLE 1

Preparation of calcium heparinate from sodium heparinate by means of ultrafiltration through membranes having a nominal molecular cut-off at 5000

There is used in this test, as well as in the tests reported in the following examples, a sample of sodium heparinate having the following properties:

| | |
|---|---|
| Anticoagulant Activity | 163 $\mu$.I./mg |
| Na % | 12 |
| 10% Solution | clear |
| Proteins | absent |
| Total N | 2.15% |
| Total S | 10.8% |

A solution of sodium heparinate in distilled water, the concentration of which is between 1% and 15%, suitably at 7%, is subjected to diafiltration through a membrane having a molecular nominal cut-off at less than 5000 Dalton (Es. Berghoff 50M) in a suitable apparatus (Es. Amicon mod. 52) keeping the solution under suitable agitation by creating a flux of laminar-type in order to avoid phenomena of polarization of the membrane and applying a pressure between 0.1 and 5 atmospheres.

The concentration of heparin in the ultrafilter is kept constant by means of continuous addition of a solution of calcium chloride (adjusted to a pH of 7.4 by means of $Ca(OH)_2$), and the diafiltration if continued at a temperature between 4° C. and room temperature up to the time when a volume corresponding to 5 times the original volume of the solution of sodium heparinate has gone through the membrane.

The excess of calcium chloride is eliminated by diafiltration by continuous addition of distilled water in such a quantity to subject to ultrafiltration a volume equal to 5 times the original volume of the solution of sodium heparinate. Finally, calcium heparinate is recovered by precipitation which ethanol.

The specific anticoagulant activity of calcium heparinate obtained according to the British Pharmacopoeia requirements is equal to 183 $\mu$.I./mg. The yield of the transformation is equal to 92%.

EXAMPLE 2

Preparation of calcium heparinate using as a starting material sodium heparinate by means of hyperfiltration through membranes having a nominal molecular cut-off at 600

A solution of sodium heparinate having a concentration between 1 and 15% of distilled water, preferably 7%, is subjected to hyperfiltration in an apparatus suitable for hyperfiltration (inverse osmosis) with a membrane having a permeability to sodium ion in the order of 75%, according to a method analogous to the method described under Example 1. The pressure required in order to achieve permeation is in the order of 25 atmospheres.

After addition of ethanol, a precipitate of calcium heparinate is obtained which is in accordance with the British Pharmacopoeia requirements and which has an anticoagulant activity equal to 178 $\mu$.I./mg. The yield of the transformation is equal to 95%.

EXAMPLE 3

Preparation of calcium heparinate from sodium heparinate by means of flow dialysis The apparatus used for this experiment is similar to the apparatus commonly used for hemodialysis. A dialyzer of the type Hemoclear of 1.4 m$^2$ diameter has been used but other hemodialyzers, for instance having hollow fibers or coiled dialyzers may also be used.

A solution of sodium heparinate in distilled water of concentration of between 1 and 25% p/v, preferably 15%, is pumped with provision for recycle or with provision for repeated stages with a flow between 10 and 200 ml/min in one of the compartments of the hemodialyzers while a solution of $CaCl_2$ adjusted to pH 7.2 with $Ca(OH)_2$, of concentration between 0.05 and 1 M, preferably 0.3 M, is pumped into the second compartment with a flow between 10 and 500 ml/min.

The flow of the $CaCl_2$ solution is allowed to proceed up to the point when the volume of material which has gone through, is ten times the volume of the original solution of sodium heparinate. The temperature during the process is kept at between 4° C. and room temperature.

The solution of calcium heparinate is quantitatively recovered and the heparin salt is precipitated by addition of ethanol. There is obtained calcium heparinate having the following properties:

| | |
|---|---|
| 5% Solution | clear and colorless |
| pH of the 5% Solution | 7 |
| Total N | 2.13% |
| Na | 0.07% |
| Ca | 10.4% |
| Anticoagulant Activity | 180 $\mu$.I./mg |

In the alternative, the operation which has been described in this example may also be carried out with essentially equal results by direct dialysis of a solution of sodium heparinate by addition of calcium salt.

What is claimed is:

1. A process for the preparation of the calcium salt of heparin containing an amount of sodium by weight not in excess of 0.1% and containing an amount of calcium by weight not less than 9.5% which comprises subjecting a solution of sodium heparinate to ultrafiltration in the presence of a soluble calcium salt by means of a semi-permeable membrane which has a molecular nominal cut-off at less than 5000 Dalton, and wherein the fraction of the solution which has not gone through and which contains heparin is maintained at a constant concentration of heparin through continuous addition of a solution of calcium salt of concentration between 0.05 and 2 molar in calcium ions, and isolating said calcium heparinate with anticoagulant activity essentially equal to the anticoagulant activity of said sodium heparinate.

2. A process for the preparation of the calcium salt of heparin containing an amount of sodium by weight not in excess of 0.1% and containing an amount of calcium by weight not less than 9.5% which comprises subjecting a solution of sodium heparinate to hyperfiltration by means of a semipermeable membrane having a cut-off at 600 Dalton and having a permeability to sodium of about 75% and the aqueous solution of sodium heparinate, of a concentration between 0.5% and 20% p/v is allowed to flow through the membrane with a pressure between 0 and 60 atmospheres and the fraction of the solution which has not gone through is kept at a concentration of heparin which is constant by continuous addition of a solution of a calcium salt of a concentration between 0.05 and 2 M in calcium ions, and isolating said calcium heparinate with anticoagulant activity essentially equal to the anticoagulant activity of said sodium heparinate.

3. The process according to claim 2 wherein the fraction of the solution which does not go through the membrane and which contains heparin is kept at a constant concentration between 0.5% and 20% w/v.

4. The process according to claim 3 wherein the concentration is about 7% w/v.

* * * * *